(12) United States Patent
McConnell et al.

(10) Patent No.: US 7,461,033 B1
(45) Date of Patent: Dec. 2, 2008

(54) COMPUTATION LINGUISTICS ENGINE (75) Inventors: Von McConnell, Leawood, KS (US); Warren Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 116 days.

(21) Appl. No.: 11/315,958

(22) Filed: Dec. 22, 2005

(51) Int. Cl.
*G06F 15/18* (2006.01)
(52) U.S. Cl. .............................. 706/12; 706/50; 706/60; 707/5
(58) Field of Classification Search ................ 706/60, 706/50, 12; 707/5, 4, 3; 715/716
See application file for complete search history.

(56) References Cited

U.S. PATENT DOCUMENTS

| 6,418,440 | B1 * | 7/2002 | Kuo et al. ..................... 707/10 |
| 2003/0120639 | A1 * | 6/2003 | Potok et al. ..................... 707/3 |
| 2006/0074980 | A1 * | 4/2006 | Sarkar ..................... 707/104.1 |

OTHER PUBLICATIONS

Peter Jackson and Isabelle Moulinier, Natural Language Processing for Online Applications: Text Retrieval, Extraction and Catergorization, Copyright 2002, pp. 1-17 and 75-118, John Benjamins (Publisher).
Shih-Hung Wu, et al., "Domain Event Extraction and Representation with Domain Ontology," http://www.isi.edu/info-agents/workshops/ijacai03/papers/Wu-IJCAI-03%20workshop%20REVISE%20version.pdf#search='domain%20event%20extraction%20and%20Representation, printed Dec. 15, 2005.
Kiyotaka Uchimoto, et al., "Text Generation from Keywords," Communications Research Laboratory.
Alistair Knott, et al., "A dialogue-based knowledge authoring system for text generation," http://www.cs.otago.ac.nz/staffpriv/alik/papers/aaai03.pdf#search='text%20generation', printed Jan. 4, 2006.
Rani Nelken, et al., "Disambiguation for Text Mining on the Web," http://www2003.org/cdrom/papers/poster/p302/final_poster/final_html_version.htm, printed Jan. 4, 2006.
Richard Fikes, et al., "Large-Scale Repositories of Highly Expressive Reusable Knowledge," http://ksl-web.stanford.edu/HPKB/abstract.html, http://ksl-web.stanford.edu/HPKB/rationale.html, http://ksl-web.stanford.edu/HPKB/innovative.html, printed Jan. 4, 2006.

* cited by examiner

*Primary Examiner*—David R Vincent
*Assistant Examiner*—Kalpana Bharadwaj (57) ABSTRACT

A system and method for generating textual structures describing the information contained on multiple web pages and blogs. The system comprises an ontology module, summation module, language generation module, and language bias module. The method comprises receiving a request for summarized web information, accumulating text from a plurality of web pages, parsing the accumulated text, indexing the text into a plurality of information sets, storing the plurality of information sets into a memory structure, aggregating information contained in the plurality of information sets to create a structure interpretation to satisfy the request, and creating at least one new textual structure from the structure interpretation. The ontology module parses and tags accumulated web text. The summation module creates a structure interpretation of the parsed and tagged web text. The language generation module creates textual structure describing the structure interpretation.

15 Claims, 6 Drawing Sheets

COMPUTATION LINGUISTICS ENGINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The Internet is a worldwide system of interconnected computer networks that transmits data in packets. Various information and services are carried over the Internet, such as electronic mail (e-mail), online chat rooms, and the World Wide Web (the Web). In particular, the Web is an information space in which online documents called web pages are stored and published for the entire computing world to access. Anyone connected to the Internet can view the myriad of web pages available online by accessing global identifiers called Uniform Resource Identifiers (URIs).

A web page is a simple file containing, for example, text and a set of Hypertext Markup Language (HTML) tags that describe how the text should be formatted on a screen. HTML tags are simple instructions that tell web browsers how a web page should look when it is displayed. For example, HTML tags may describe a web page's fonts, colors, title, etc. Furthermore, web pages may be accessed via the Hypertext Transfer Protocol (HTTP) and may be displayed according to HTML tags by a software package called a web browser. Web browsers identify web pages on web servers by their URIs. Examples of web browsers include Microsoft® Internet Explorer, Opera Netscape Navigator, Firefox, and Thunderbird. Once a web page is retrieved, the web browser interprets the page's HTML tags and displays it accordingly on a screen.

A web site is a collection of individual related web pages. Examples of different types of web sites include archive, business, database, and news sites. One specific type of web site gaining popularity today is the "weblog," also known as "blog." A blog is a web site containing periodic articles and posts, usually presented in reverse chronological order. Generally, blogs are much simpler than other web sites. Rather than being composed of many individual pages connected by hyperlinks, blogs are composed of a few templates (usually Main Page, Archive Page, and Individual Article/Item Page), into which content is fed from a database. This allows for easy creation of new pages, since new data is entered into a simple template and then submitted, which effectively adds the article to the blog.

All language is biased by its basic nature and is a consequence of individual history, opinions, context, ethics, experiences, belief structures, or other bias. Consequently, web pages and blog posts are typically slanted to the author's point of view. There are many instances where users may wish to substitute their own preferred biases for those of a web page or blog author.

Since its inception, the Web has rapidly expanded to include a vast and diverse amount of online information and provide a global forum for unregulated public speech. With the advent of new web-building software, such as Microsoft® FrontPage®, Macromedia Dreamweaver, Mozilla Composer, Blogger, Xanga, Typepad, etc., it has become much easier to create and publish information online. As a result, a plethora of web pages, blogs, and other online sources that describe and discuss nearly every aspect of life are readily available on the Web. Internet search engines like Google and Yahoo! search online documents using keyword-driven search technology. However, these services merely direct a user to web pages. They do not synopsize information, alleviate author bias, or allow the user to interpret the information with their own particular bias. Also, as the number of online documents keeps increasing, keyword-driven searches will provide larger results for a user to navigate through for information. Therefore, a need exists to assimilate blogs and web pages by specific topic, analyze them, and summarize their underlying objective content.

BRIEF SUMMARY OF THE INVENTION

In the present invention, multiple modules create and generate objective textual structures that summarize information about a specific topic contained in a plurality of web documents. An ontology module receives a feed of web documents in response to a request for information about the specific topic. The ontology module parses the textual structures in each document and tags any information relevant to the topic. A summation module sorts through all of the information tagged by the ontology module and creates an interpretation of the information's content. A language bias module adjusts the interpretation to account for bias and creates an objective interpretation. A language generation module uses predefined grammar rules and templates to create a grammatically correct textual structure detailing the objective interpretation.

DETAILED DESCRIPTION

Various embodiments will be better understood from the detailed description provided below and from the accompanying drawings. However, the detailed description and drawings should not be read to limit the claims. Rather, these specifics are provided for explanatory purposes.

Figure 1:
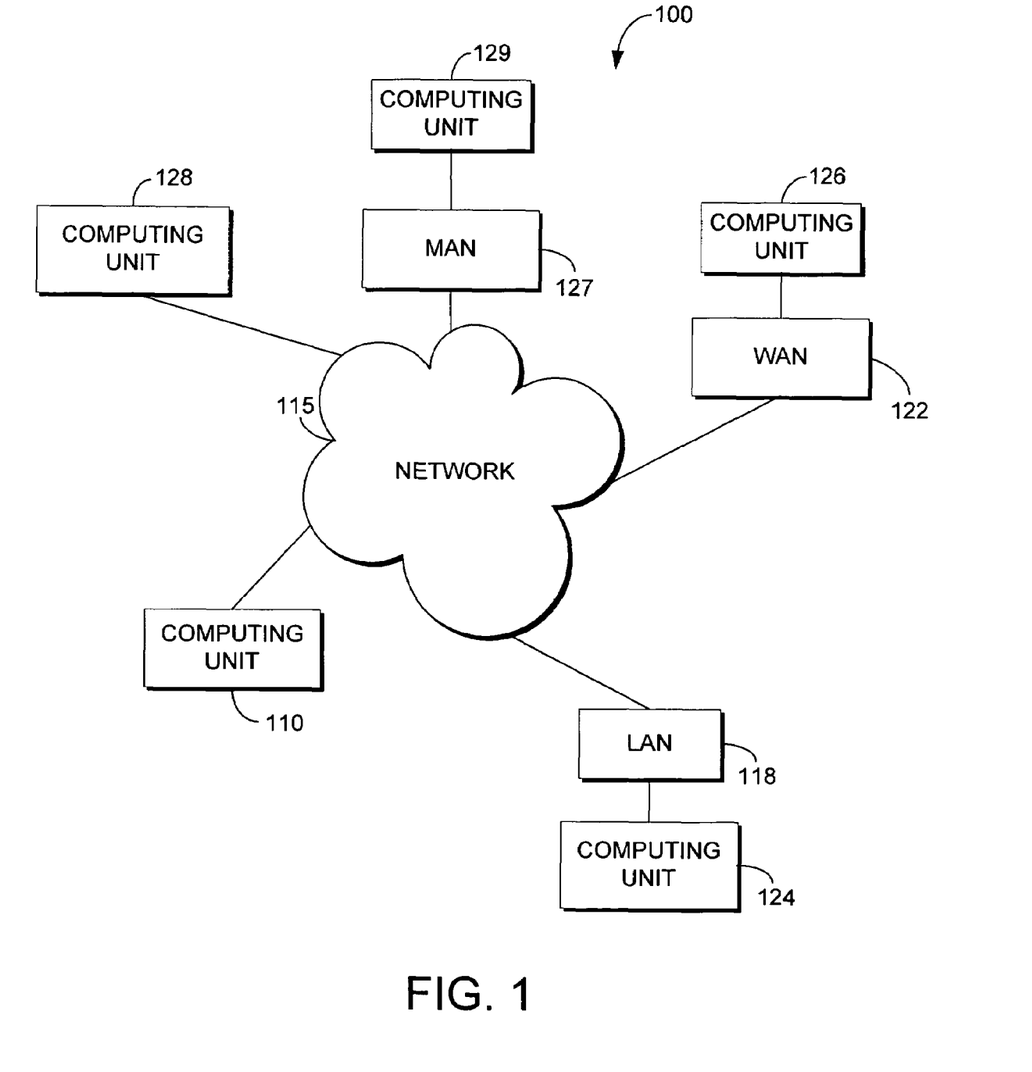
FIG. 1 is a block diagram of a network environment that is suitable for use in implementing the present invention.

Referring initially to FIG. 1 in particular, a network environment that is suitable for use implementing the present invention is illustrated. Network environment 100 is but one example of a suitable environment and is not intended to limit the scope of use or functionality of the invention. Neither should network environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, network environment 100 includes computing unit 110 coupled with network 115. Computing units 110, 124, 126, 128 and 129 represent computing devices that can read and execute software instructions. Examples of such devices include a computer, server, printer, PDA, hand-held device, cellular phone, digital device, or the like. However, embodiments are not limited to any particular number of computing devices or any particular configuration or assortment thereof. In an embodiment, each computing unit includes a plurality of computing devices. Network 115 represents a system for communication between computing units. In an embodiment, network 115 comprises an Internet service provider ("ISP"), which is an entity providing access to the Internet. In another embodiment, network 115 comprises multiple ISPs coupled together. Examples of such entities include Netzero, Juno, Earthlink, or the like. However, network 115 is not limited to ISPs, and, in embodiments, may comprise private networks. Such private networks may include, for example, a small office/home office ("SOHO") network, value-added network ("VAN"), peer-to-peer network, bus network, Ethernet, star network, ring network, mesh network, star-bus network, or similar network for communicating information between multiple computers. In an embodiment, network 115 comprises a backplane bus to accommodate multiple modules placed in the same physical cabinet.

Computing units 110, 124, 126, 128 and 129 are coupled with network 115 via wireless connection, dial-up line, high-speed phone line (such as a T1 or T3 connection), fiber-optic line, or similar transmission line. In an embodiment, LAN 118 represents a local area network, which couples computing unit 124 with network 115. In an embodiment, computing unit 124 represents multiple computing units that are interconnected via LAN 118. In an embodiment, WAN 122 represents a wide area network, which couples computing unit 126 with ISP 115. In an embodiment, computing unit 126 represents multiple computing units that are interconnected via WAN 122. In an embodiment, MAN 127 represents a metropolitan area network, which couples computing unit 129 with network 115. In an embodiment, computing unit 129 represents multiple computing units that are interconnected via MAN 127.

Computing units 110, 124, 126, 128 and 129 may include a variety of computer-readable media. By way of example, and not limitation, computer-readable media may comprise Random Access Memory ("RAM"); Read Only Memory ("ROM"); Electronically Erasable Programmable Read Only Memory ("EEPROM"); flash memory or other memory technologies; CDROM, digital versatile disks ("DVD") or other optical or holographic media; magnetic cassettes, magnetic tape, magnetic disk storage or other magnetic storage devices, carrier wave or any other medium that can be used to encode desired information. In addition, the computing units illustrated in FIG. 1 may also comprise computer-storage media in the form of volatile and/or nonvolatile memory. The memory may be removable, nonremovable, or a combination thereof. Exemplary hardware devices include solid-state memory, hard drives, optical-disc drives, cache, real time memory, etc.

Figure 2:
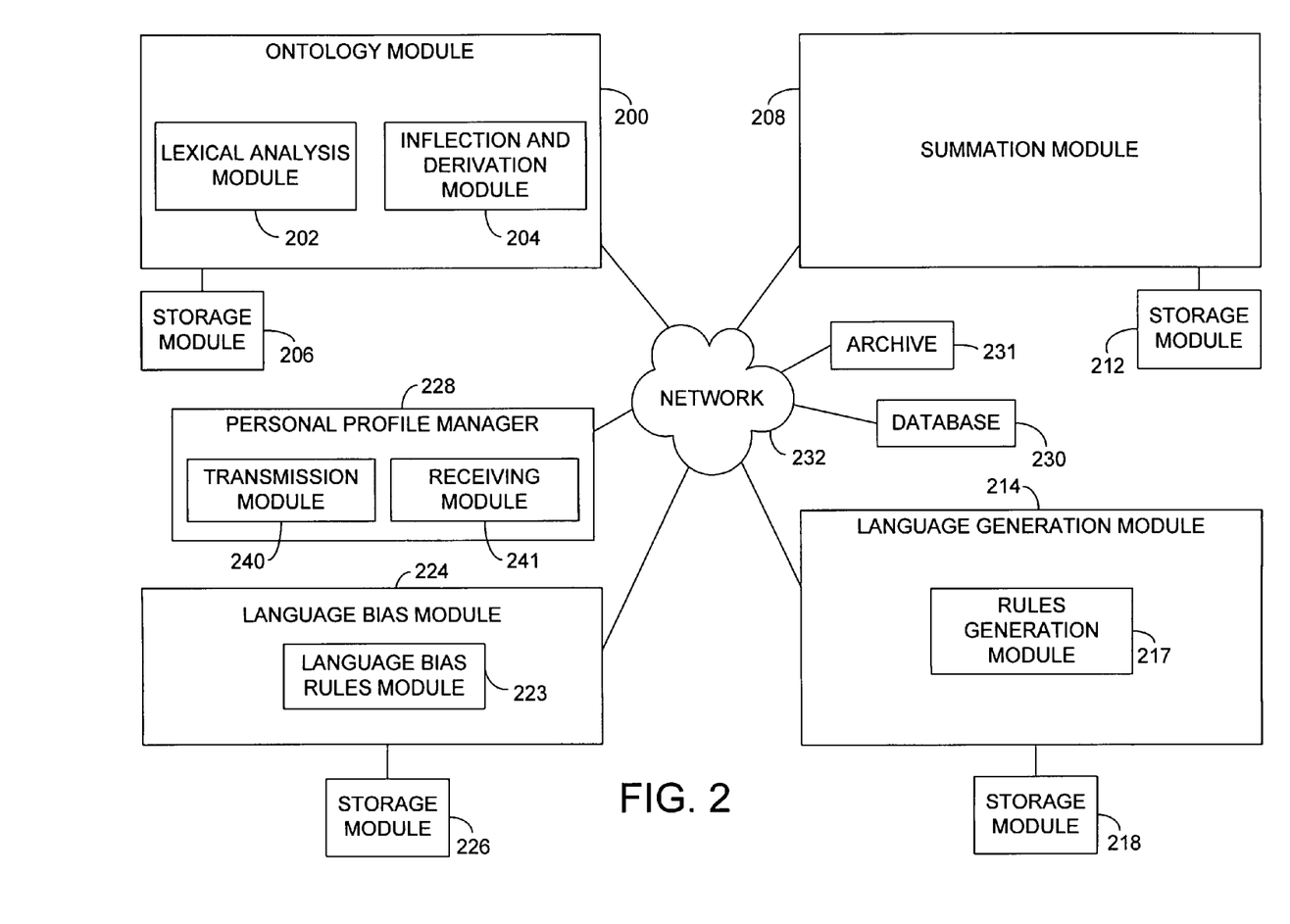
FIG. 2 is a block diagram of a system for generating a textual structure that summarizes information provided by various web pages or blogs about a specific subject, according to embodiments of the present invention.

FIG. 2 is a block diagram of a system for generating a textual structure that summarizes information provided by various web pages or blogs about a specific subject, according to embodiments of the present invention. As illustrated in FIG. 2, ontology module 200, summation module 208, language generation module 214, and language bias module 224 refer to hardware or software components. Examples of such components include, for example, machine instructions, assembly language, software code, logic chips, fuzzy logic, Boolean logic, high-level matrix recoding, microprocessors, neural networks, central processing units ("CPUs"), microcontrollers, any combination thereof, or similar hardware or software. The above list is not meant to be exhaustive, and embodiments are not limited to any specific type of hardware or software. Rather, each of the above modules may comprise any hardware or software capable of executing instructions.

In one embodiment, ontology module 200, summation module 208, language generation module 214, and language bias module 224 are separate modules. In other embodiments, a single module functions as a combination of ontology module 200, summation module 208, language generation module 214, or language bias module 224. In yet other embodiments, multiple modules are coupled together creating one of the modules illustrated in FIG. 2. For example, ontology module 200 may comprise parallel CPUs. In another embodiment, the modules illustrated in FIG. 2 are positioned within a single computing system. For example, storing ontology module 200's parallel CPUs may be stored in the same cabinet. However, embodiments are not limited to any particular software or hardware setup.

In an embodiment, ontology module 200, summation module 208, language generation module 214, and language bias module 224 execute on separate computing units. For example, without limitation, the four modules of FIG. 2 may be running on four separate computers. In another embodiment, multiple modules execute on the same computing unit. For example, all four modules of FIG. 2 may be running within a single cabinet.

In embodiments, the components illustrated in FIG. 2 communicate with each other via network 232. Many computing network connections may function as network 232, including, without limitation, wireless, a telephone line, high-speed line, fiber-optic line, local area network (LAN), wide area network (WAN), or the like. However, network 232 is not limited to connections coupling separate computer units. Rather, network 232 may also comprise subsystems that transfer data or power between computer. For example, network 232 may also include a point-to-point connection, an internal system Ethernet, a backplane bus, an electrical bus, a neural network, or other internal system. In an embodiment where network 232 comprises a LAN networking environment, components are connected to the LAN through a network interface or adapter. In an embodiment where network 232 comprises a WAN networking environment, components use a modem, or other means for establishing communications over the WAN, to communicate. In embodiments where network 232 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

Storage modules 206, 212, 218, 226, archive 231, and database 230 comprise computer-storage media in the form of volatile and/or nonvolatile memory. In embodiments, they may include, but are not limited to, RAM, ROM, EEPROM, flash memory, cache memory, compressed memory, or other memory technology, CD-ROM, DVD, or other optical disk storage, magnetic cassettes, magnetic tape, magnetic disk storage, or other magnetic storage devices, or any other medium which can be used to store the desired information. Additionally, the memory may be removable, nonremovable, or a combination thereof. Furthermore, database 230 and archive 231 are central memory stores that can be accessed by any component coupled with network 232.

In an embodiment, storage module 206 stores an information set created by ontology module 200. An information set comprises various data referencing a textual structure's syntax, definition, or underlying meaning. In addition, in embodiments, an information set may also comprise associated root words, lexicons, homonyms, synonyms, or other related lexical ontology. Information sets may comprise, for example, words, definitions, phrases, as well as software references such as alphanumeric markers, numeric markers, or pointers. However, information sets are not limited to any specific type of stored data type.

In an embodiment, storage module 212 stores a structure interpretation generated by summation module 208. A structure interpretation comprises various data that summarizes the information contained in a plurality of information sets. Structure interpretations may comprise, for example, words, definitions, or phrases as well as software references such as alphanumeric markers, numeric markers, or pointers. However, structure interpretations are not limited to any specific type of stored data type.

In another embodiment, storage module 218 stores a grammatically correct textual structure created by language generation module 214. In another embodiment, storage module 226 stores web source bias values used by language bias module 224.

As FIG. 2 illustrates, in embodiments, storage modules 206, 212, 218, and 226 are located off-board and coupled with ontology module 200, summation module 208, language generation module 214, or language bias module 224. However, FIG. 2 merely depicts one exemplary embodiment and the present invention is not limited to any method of coupling or accessing memories. For example, in embodiments, storage modules 206, 212, 218, and 226 respecitvely reside on-board ontology module 200, summation module 208, language generation module 214, or language bias module 224. In another embodiment, storage modules 206, 212, 218, and 226 are coupled with ontology module 200, summation module 208, language generation module 214, or language bias module 224 via network 232. Furthermore, to prevent information stored in storage modules 206, 212, 218, and 226 from becoming stale, different methods for purging data may be used and are well known in the art.

In an embodiment, database 230 is a central memory that is accessible via network 232 by ontology module 200, summation module 208 personal profile manager 228, language bias module 224, language generation module 214, or any combination thereof. In one embodiment, database 230 is a logical database comprised of multiple databases. In an embodiment, database 230 is a single database. In an embodiment, database 230 stores commonly used information. For example, database 230, in an embodiment, stores an information set, structure interpretation, newly generated textual structure, user bias preferences, text grammatical intent and underlying base structure, or other information used by the inventive modules. To prevent information stored in database 230 from becoming stale, different methods for purging data may be used and are well known in the art.

In operation, ontology module 204 parses textual structures resident on accumulated web pages or blogs revealing grammatical syntax and underlying semantics. In an embodiment, ontology module 204 also classifies parsed textual structures into manageable information sets and stores the information sets into either storage module 206 or database 230. In an embodiment, information sets are cached for quick future retrieval. In general, ontology module 200 categorizes accumulated web textual structures, which include words, abbreviations, sentences, numbers, phrases, or other language contained on a web page or blog. In an embodiment, ontology module 200 comprises lexical analysis module 202 and inflection and derivation module 204.

In an embodiment, parsing cannot proceed in the absence of lexical analysis, and so it is sometimes necessary to first identify the root forms of word occurrences in web textual structures and determine their parts of speech. Lexical analysis module 202 is a program, routine, subroutine, or other set of instructions for parsing textual structures on a web page into basic grammatical components. Such grammatical components include, for example, nouns, verbs, adjectives, adverbs, etc. In an embodiment, ontology module 200 tags textual structures with an alphanumeric value to describe their underlying grammatical syntax. In embodiments, the alphanumeric values are stored in storage module 206 or database 230. Furthermore, lexical analysis module 202 may also use various well known methods in the art to determine grammatical syntax. For example, many modern word processors contain grammar functions that classify written text to determine whether a specific sentence is lacking a noun or a verb. Methods employed by such word processor applications can similarly be used by lexical analysis module 202 to determine grammatical syntax of accumulated web textual structures.

In addition to tagging textual structures according to underlying syntax, ontology module 200 uses inflection and derivation module 204 to determine the underlying semantics of accumulated textual structures. Inflection and derivation module 204 is a program, routine, subroutine, or other set of instructions for revealing underlying grammatical intent of each accumulated web textual structure. In general, language is an accumulation of known definitions of words. Therefore, in an embodiment, inflection and derivation module 204 determines each accumulated textual structure's definition by referencing and cross-referencing known definitions from published sources. Such sources may include dictionaries, thesauri, encyclopedias, etc. However, the present invention is not limited to any particular type or number of published sources. In embodiments, such known definitions are accessed over the Internet, or a private network, or are stored in database 230, storage module 206, or other computer-readable media.

One limitation to matching textual structures with known definitions is the fact that numerous words have multiple meanings. For example, "lie" may mean an assertion that is untrue or to occupy a certain position. To account for multiple definitions, inflection and derivation module 204, in an embodiment, cross-references multiple known existing definitions contained in various published sources and uses a statistical analysis to determine which definition was meant. The statistical analysis will inevitably determine a textual structure's definition among a database of definitions by comparing the frequency of specific parameters. In an embodiment, the statistical analysis takes into account the number of times a textual structure has previously been mapped to a specific definition. For example, if "lie" has previously been used 1,000 times to mean an untrue assertion, while only 100 times for occupying a position, it is more probable that "lie" was meant to refer to an untrue assertion.

In an embodiment, multiple published sources are cross-referenced to account for slang meanings or alternative definitions. Such sources may include, for example, slang dictionaries, alternative dictionaries, etc. Another limitation arises when new words are constantly introduced. To account for additions to language, in an embodiment, a separate dictionary or memory storage is continually updated with newly defined words, and cross-referenced to determine a textual structure's underlying meaning. In an embodiment, the memory storage is updated by a system administrator. The system administrator may be, for example, a person given supervisory rights over the system or a global program. However, embodiments are not limited to any specific type or quantity of system administrators.

In an embodiment, the statistical analysis also takes into account subtending classifications to achieve more relevant contextual definitions. Subtending classifications are textual structures that contain interconnected meanings. For example, "Republican" would be classified as a noun, plus have subtending classifications such as "political," "politician," "affiliation," etc. In an embodiment, ontology module 200 determines a subtending classification by comparing a textual structure's known definition with other closely related definitions. Once uncovered, in an embodiment, the subtending classification is tagged or referenced to denote closely related definitions in storage module 206 or database 230. In another embodiment, ontology module 200 associates subtending classifications with a textual structure from a database or other computer-readable medium that stores such classifications. Such databases or media may be uploaded from a vendor, supplied by a user through personal profile manager 228, or consistently updated by ontology module 200 after an association is determined.

Once a textual structure's definition is determined, it is stored, in embodiments, in either storage module 206 or database 230 as an information set. In other embodiments, definitions for each textual structure are given a reference pointer comprising a numeric or alphanumeric representation, which references a definition stored in database 230, storage module 206, or other memory storage structure that stores definitions. For such embodiments, an information set comprises all of the pointers for a particular web page. In an embodiment, pointers are used to reference slang definitions, alternative meanings, subtending classifications, or child branches. Ontology module 200 provides such pointers from definitions back to the original web page or blog from which the textual structure was accumulated.

In linguistic parlance, stemmers are morphological analyzers that associate variants of the same term with a root from.

The root can be understood as the form that would normally be found as an entry in a dictionary. For instance, "go," "goes," "going," "gone," and "went" are associated with the root form "go." In general, there are two types of morphological analyzers: inflectional and derivational. Inflectional morphology expresses syntactic relations between words of the same part of speech (e.g. inflate and inflates), while derivational morphology expresses lexical relations between words that can be different parts of speech (e.g. inflate and inflation). More specifically, inflectional morphology stemmers comprise variations in word forms needed to express grammatical features, such as singular/plural or past/present tense. On the other hand, derivational morphology stemmers comprise new words created from old words in which bother are related by a common root form. Derivation stemmers usually involve a change in the grammatical category of a word, and may also involve a modification to its meaning. For example, "unkind" is formed from "kind," but has the opposite meaning. Derivational morphology stemmers may also include synonyms or homonyms. For example, the word "old" may be referenced to "elderly." In an embodiment, inflection and derivation module 204 uses various alphanumeric pointers to point to different definitions accounting for inflectional and derivational morphology stemmers.

In an embodiment, summation module 208 aggregates parsed textual structures accumulated from a plurality of web pages into at least one structure interpretation of the specific topic. In an embodiment, summation module 208 accesses the information sets created by ontology module 200, and summation module 208 executes matching routines across multiple information sets. In operation, summation module 208, in an embodiment, determines the syntactical structures (e.g. noun, verb, adjective, etc.) of all textual structures in an information set. Then, in an embodiment, summation module 208 uses the syntactical textual structures in combination with the tagged definitions of the textual structures to determine the relevant portions of information regarding the specific topic. In an embodiment, summation module 208 determines the number of times all information sets use each textual structure as a specific type to mean a particular definition. These number of times are counted to determine the most probable relationship of information from which to form a structure interpretation. In addition, embodiments may also use various subtending classifications and associated words as parameters when running probability analyses.

In an embodiment, summation module 208 follows such structures as outlined in the Standard Upper Merged Ontology ("SUMO") of the Institute of Electrical and Electronics Engineers ("IEEE") standard upper ontology-working group. Whereas ontology module 204 indexes information from individual web pages, summation module 208 sums information across multiple web pages. Furthermore, summation module 208 couples to network 232 and is optionally coupled with storage module 212, which stores structure interpretations created by summation module 210. In an embodiment, a structure interpretation comprises a list of words taken from a plurality of information sets describing the requested topic. In other embodiments, a structure interpretation comprises a collection of alphanumeric or numeric markers, pointers, or other indicia of textual structures' syntax or semantics.

In an embodiment, language generation module 214 comprises rules generation module 217. Language generation module 214 is a program, routine, subroutine, or other set of software instructions that, when executed, constructs and generates new grammatically correct sentence structures that describe new structure interpretations generated by summation module 208. Grammatical templates provide basic grammar confines, such as noun/verb association, syntax structure, punctuation, etc., within which to build grammatically correct sentences. These grammatical templates are contained in and uploaded to rules module 217, which, in an embodiment, is a program, routine, subroutine, or other set of software instructions. In embodiments, grammatical templates are manually loaded by a system administrator and then modified by individual users in personal profile manager 228. In another embodiment, grammar templates are referenced within other systems, such as large-scale academic or commercial systems. Furthermore, grammatical templates for various languages, such as English, Spanish, French, etc., may be used to govern new sentence generation. Moreover, language generation module 214 is optionally coupled with storage module 218. In embodiments, newly constructed grammatically correct sentences are stored in storage module 218, database 230, or archive 231.

In an embodiment, language bias module 224 includes language bias rules module 223. In general, language bias module 224 is a program, routine, subroutine, or other set of software instructions that, when executed, reformats newly generated textual structures to account for user or system bias preferences. In an embodiment, language bias rules module 223 is a memory that stores a library of rules used to correct source bias. In embodiment, these rules are set by a system administrator or the user and used to mark the bias of certain sources. The system administrator can set values corresponding to different levels of bias and upload them to language bias rules module 223. For example, the administrator may assign the New York Times' web site with a value describing it as a liberal newspaper. Thereafter, text taken from that site about Republican presidential candidates may be given less deference than text taken from a less liberal newspaper. In addition, subscribing users who prefer a more conservative view of information can be excluded from receiving textual structures from a New York Times article.

In an embodiment, language bias rules module 223 stores a list of terms or templates that can be inserted into newly constructed sentence structures to account for source bias. In an embodiment, language bias rules module 223 assigns values to a web page corresponding to its relative bias. However, embodiments are not limited to the system administrator setting bias preferences. In an embodiment, language bias rules module 223 stores bias values associated with individual words. For example, the word "old" may be marked as more offensive in certain contexts than the word "mature." Accordingly, an alphanumeric marker may be assigned that describes "mature" as a less offensive word.

In an embodiment, personal profile manager 228 comprises transmission module 240 and receiving module 241. In an embodiment, receiving module 241 receives individual user traits (e.g. demographic location, political association, preferences of topics, bias preferences, etc.) and stores such traits in database 230. However, embodiments of the present invention are not limited to any particular traits. In an embodiment, transmission module 240 broadcasts such information to network 232 as user-specific parameters. In an embodiment, personal profile manager 228 requires users to register and set user-specific parameters. In another embodiment, personal profile manager 228 contains a field for a user to request information about a specific topic. In yet another embodiment, the user's request is compared with results stored in database 230 to determine whether an answer has already been created. In an embodiment, users may continually reference and use existing bias templates or create and customize their own bias templates.

In an embodiment, archive 231 is a central memory that is accessible via network 232 by ontology module 200, summation module 208 personal profile manager 228, language bias module 224, language generation module 214, or any combination thereof. In one embodiment, archive 231 is a logical database comprised of multiple databases. In another embodiment, archive 231 is a single database. In operation, archive 231 stores textual structures created by language generation module 214. Archive 231, in an embodiment, is coupled with network 232 and accessible by any component (e.g. module or computer-storage media) also coupled with network 232. Furthermore, to prevent information stored in archive 231 from becoming stale, different methods for purging data may be used and are well known in the art. In an embodiment, archive 231 stores language generation module 214's newly generated textual structures. Once a textual structure is generated for a specific topic and within a common template, the textual structure is stored in archive 231 for future use. In an embodiment, the textual structure is stored in a compressed manner. However, embodiments are not limited to any specific encoding scheme. In an embodiment, archive 231 is accessed to determine whether it contains a textual structure answering a topic request. In an embodiment, the textual structure is kept for a specific amount of time that is set by an administrator. In another embodiment, the textual structure is stored for a specific amount of time that is set by user. For example, where a blog is dedicated to natural disasters, archive 231 may store textual structures detailing different aspects of a particular disaster (e.g., a hurricane), such as wind velocity, death toll, damage, etc. When a new disaster arises, archive 231's resident information about the old disaster is purged, and new textual structures detailing characteristics of the new disaster are archived. Other forms of purging stale content may also be used and are well known in the art. Also, the length of time for keeping the textual structure, in an embodiment, is stored in personal profile manager 228.

Figure 3:
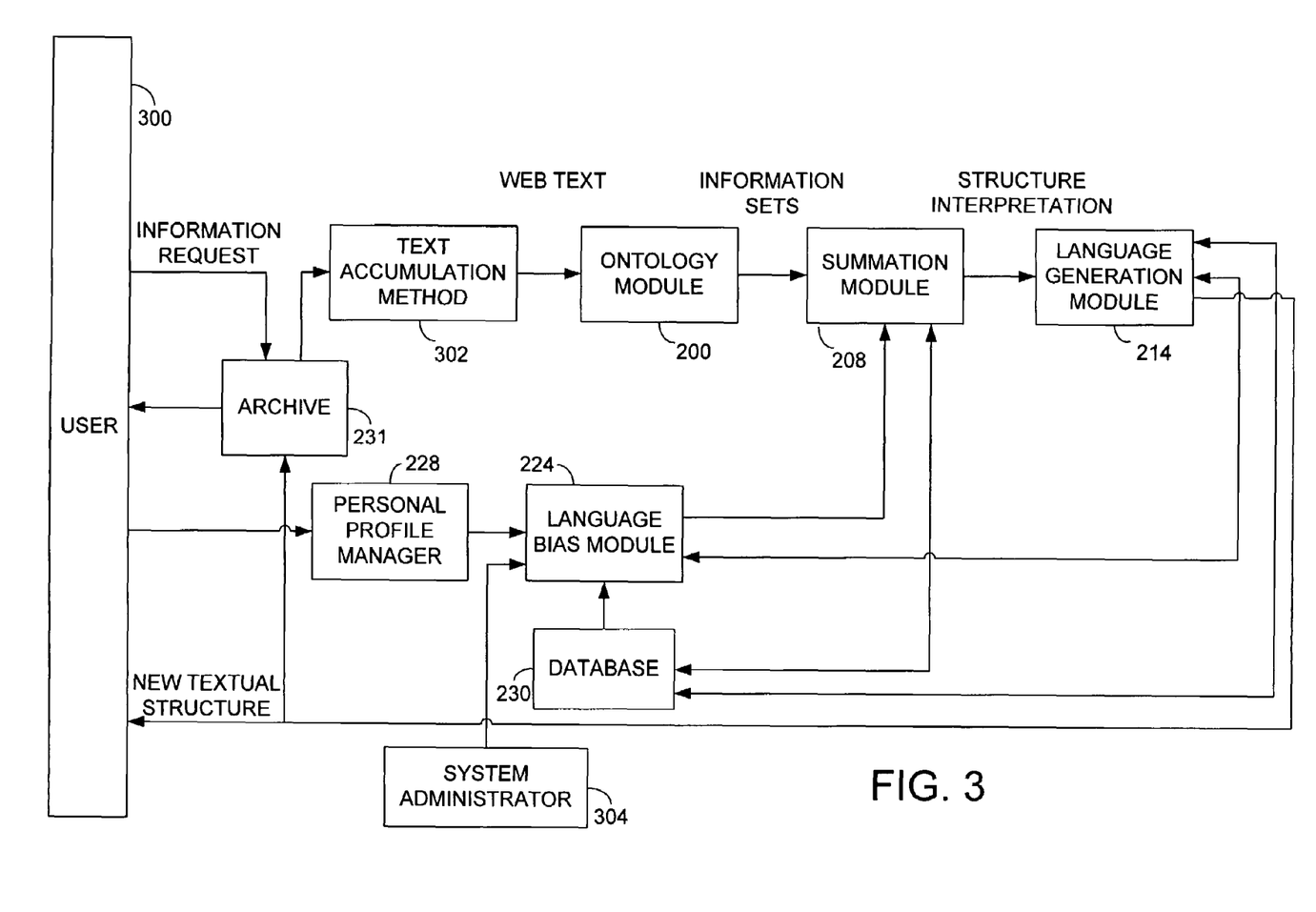
FIG. 3 is a flow diagram of a system for generating a textual structure that summarizes information provided by various web pages or blogs about a specific subject, according to embodiments of the present invention.

FIG. 3 is a flow diagram of a system for generating a textual structure that summarizes information provided by various web pages or blogs about a specific subject, according to embodiments of the present invention. As illustrated in FIG. 3, user 300 makes a request for information about a specific topic. In an embodiment, user 300 is any person or entity with access to the system. In an embodiment, user 300 subscribes to a service and provides user-specific parameter information, which is stored in personal profile manager 228. Parameter information may include any information unique to user 300, such as, for example, geographic location, political association, gender, age, ethnicity, etc. Archive 231 is checked to determine whether it contains an answer to user 300's request. If so, the archived answer is returned to user 300. If not, text accumulation method 302 is initiated.

Text accumulation method 302 obtains web sites, home pages, and other online documentation via traditional search technologies. Text accumulation method 302 may pull from or push to search technologies. Examples of traditional search technologies include, without limitation, web crawlers, RSS-based search engines and feeds, and Atom-based search technologies. A web crawler is a program that browses the Web in a methodical, automated manner. One embodiment of a web crawler browses the web sites contained in a list in search of information. Examples of web crawlers that are well known in the art include PolyBot, WebRace, Ubicrawler, Fast Crawler, WIRE, WebFountain, Mercator, etc. Furthermore, an RSS-based search engine searches RSS feeds, which are text-based XML files containing a list of items. RSS refers to either real simple syndication, rich site summary, RDF site summary, or a variation depending on the RSS version. Such a list of items may include, for example, a title, summary, URI, or similar information that can be searched for relevant keywords. Examples of RSS-based search engines that are well known in the art include, without limitation, Feedster, Daypop, BlogDigger, Fastbuzz, Complete RSS, easyRSS, Medlogs, Edu_RSS, etc. Similarly, Atom-based search engines search lists of items, which are relatively more complex than RSS lists. Any combination of these search engines may be used to find web text necessary for satisfying user 300's request. In addition, other search methods are well known in the art and can readily be used as text accumulation method 302. In an embodiment, text accumulation method 302 is limited to date specific context so that old or irrelevant information can be avoided. For example, text accumulation method 302 can be set to not search for any blogs posted prior to May 2005. However, embodiments of the present invention are not limited to any particular type of search technology or text accumulation method.

In an embodiment, web text from text accumulation method 302 is sent to ontology module 200, which parses the text. To create useful information, ontology module 200 classifies and categorizes textual structures from web pages into information sets, and stores the information sets. Information sets are then stored in storage module 206 or database 230 for later use. In an embodiment, ontology module 200 pulls web text from text accumulation method 302. In another embodiment, text accumulation method 302 pushes web text to ontology module 200.

For example, where user 300 wishes to find out information about a particular nominee for the United States Supreme Court, text accumulation method 302, in one embodiment, may produce two web pages and one blog containing information about the nominee. The first page reports that the nominee is a graduate of a particular law school. The second page names the nominee's political party affiliation. The blog negatively critiques the nominee's judicial opinions and classifies the nominee according to his strict constructionalist application of the law. Ontology module 200, in an embodiment, parses the text and creates three information sets. The first set comprises the name of the law school. The second set comprises the political party. The third set comprises constitutional philosophy, e.g., "strict constitutionalist." These three sets are stored either in storage module 206 or database 230 for future retrieval. Of course, embodiments of the present invention are not limited to any particular example or number of information sets.

In an embodiment, summation module 208 receives or accesses the information sets and creates at least one structure interpretation of the information by executing matching routines across all stored information sets. In operation, summation module 208 summarizes information contained across all of the accumulated web documents to the same level of parsing and categorization of ontology processor 200. Looking again at the example discussed above, a structure interpretation would include, for example, "Harvard Law School," "Republican," and "strict constructionalist." Structure interpretations are stored either in storage module 212 or database 230. However, embodiments are not limited to any particular structure interpretation. In an embodiment, summation module 208 uses predefined bias preferences stored in language bias module 224 to customise structure interpretations by omitting or modifying information accumulated from information sets.

In an embodiment, after ontology module 200 processes and categorizes all of the accumulated web documents and summation module 208 summarizes all information sets to the same level of parsing and categorization, language generation module 214 creates a new textual structure answering the user's request. To create a new textual structure, in an embodiment, language generation module 214 receives, or accesses, the structure interpretation generated by summation module 208. Using the structure interpretation and rules generation module 217, language generation module 214 creates a new textual structure, which is stored in archive 231. In an embodiment, the new textual structure is a phrase or grammatically correct sentence describing the structure interpretation. In an embodiment, the bias preferences created by language bias module 224 are used by language generation module 214 to customize the new textual structure according to preferences set by the user or system administrator. Thereafter, the new textual structure is displayed to user 300 via a web page, e-mail, set-top box, or other means of communication. However, embodiments are not limited to any specific media, as other ways of communicating the textual structures created by language generation module 214 may also be used.

In embodiments, language bias module 224 stores and transmits bias values of particular sources and words to language generation module 214. Then, in an embodiment, language generation module 214 creates new textual structures and modifies newly created textual structures according to bias preferences. To accomplish this, in an embodiment, language generation module 214 becomes selective with the words chosen for the newly generated textual structure. In embodiments, open sources of definitions are again cross-referenced to select the appropriate words for building a new structure. For example, if a person specifies they are sensitive to becoming older, language generation module 214 would select the word "mature," instead of "old," to describe an elderly person.

In the presidential nomination example discussed above, suppose user 300 is a Republican who does not wish to view Democrat-bias sources, and the blog is a pro-Democrat publication. Initially, language generation module 214 would create a sentence such as "John X is a Republican who graduated from ABC law school and is a strict constructionalist." However, in an embodiment, language generation module 214 would then overlay the bias preferences of language bias module 224 to customize the generated textual structure. As a result, the newly generated senescence would be reformatted to read "John X is a Republican who graduated from ABC law school." This would effectively eliminate the pro-Democrat statement that Roberts is a "strict constuctionalist" from the textual structure.

Figure 4:
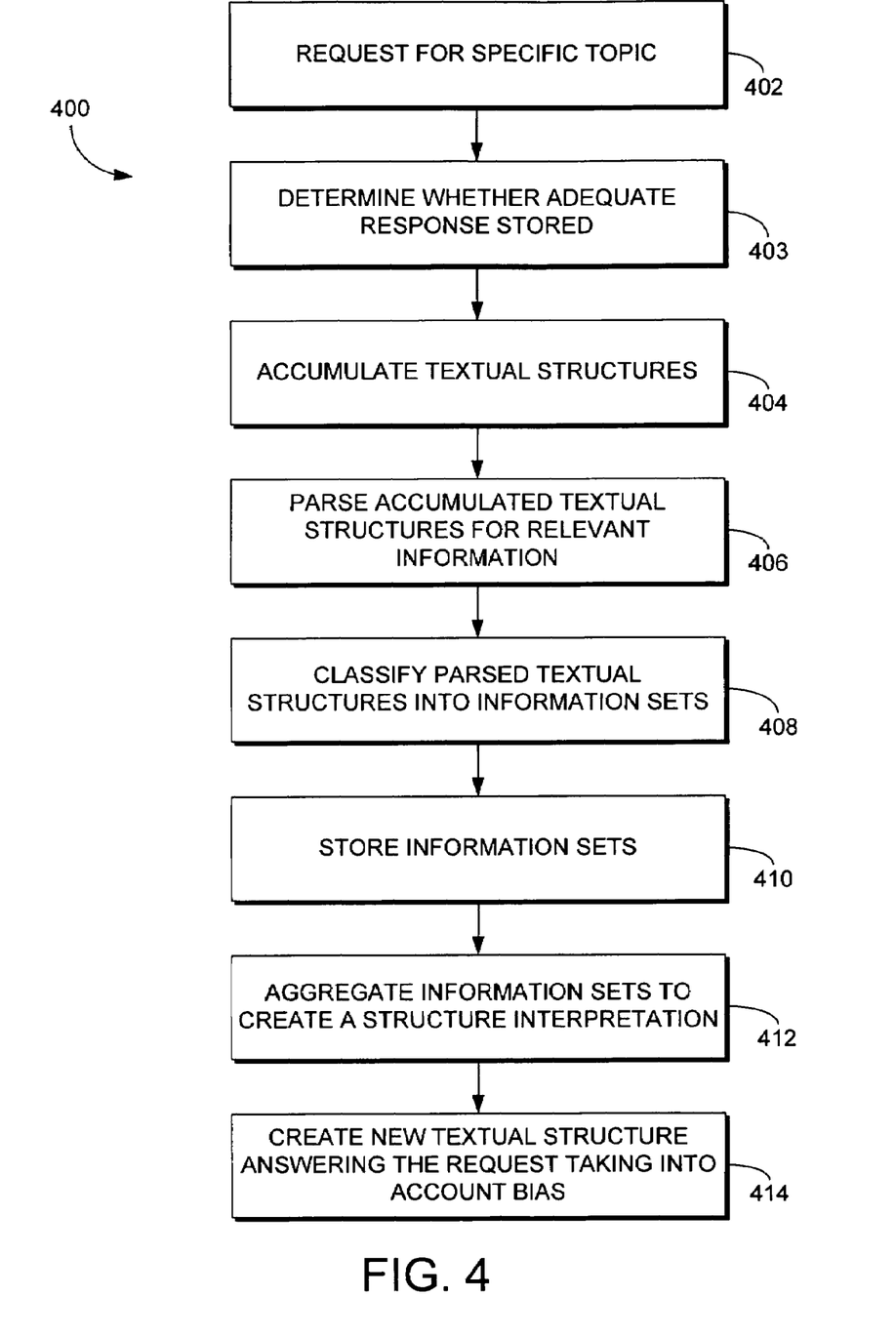
FIG. 4 is a flow chart of a process for generating a textual structure that summarizes information provided by various web pages or blogs about a specific subject, according to embodiments of the present invention.

FIG. 4 is a flow chart of a process for generating a textual structure that summarizes information provided by various web pages or blogs about a specific subject, according to embodiments of the present invention. As illustrated in FIG. 4, in one embodiment, a request for a specific topic is made (402). In another embodiment, a machine-to-machine request is made. Once a request is received, it is determined whether an adequate response is stored (403). If an answer to the request is not archived, textual structures are accumulated (404) from various web pages, blogs, or other online documentation. The accumulated textual structures are parsed for relevant information (406) and classified into information sets (408). The resultant information sets are stored (410) and aggregated to create a structure interpretation (412) of the information. New textual structures are then created answering the request (414) and customized according to bias preferences.

Figure 5:
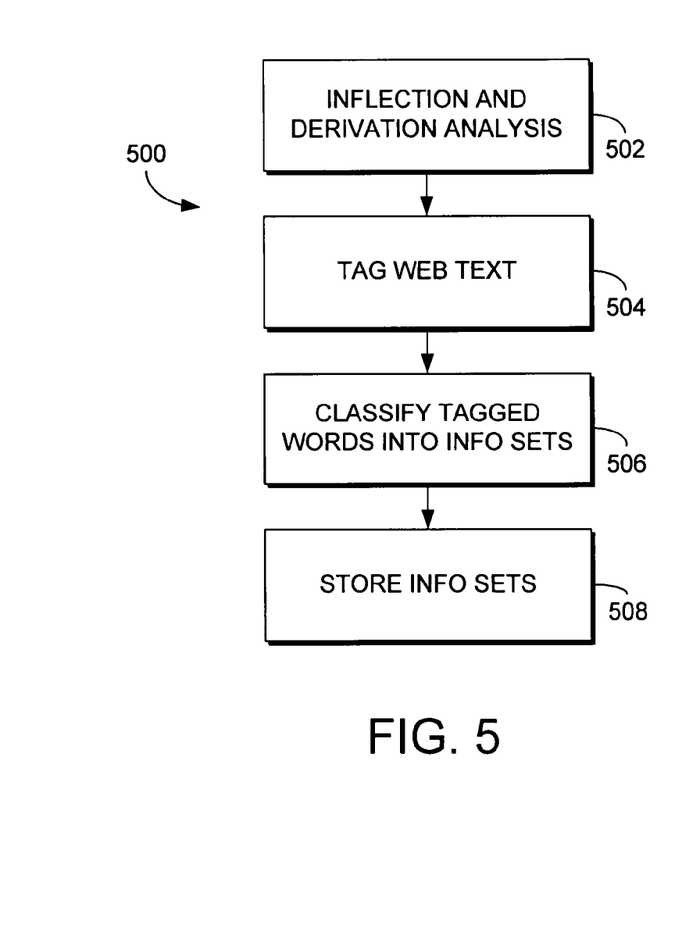
FIG. 5 is a flowchart illustrating a process that parses and classifies web textual structures, according to embodiments of the present invention.

FIG. 5 is a flowchart illustrating a process that parses and classifies web textual structures, according to embodiments of the present invention. In method 500, an inflection and derivation analysis is performed (502) on the gathered text.

The inflection and derivation analysis classifies and categorizes all words or phrases with appropriate markers (e.g. numeric, alphanumeric, etc.) or pointers. However, for most language, simple derivatives of words change the complete definition and interpretation of the base meaning. For example, "kind" and "unkind" have different meanings. In one embodiment, the inflection and derivation analysis accounts for such differences by first defining and redefining various derivatives of words (e.g. "past" vs. "passed" vs. "passing"). Then, each word is compared with the base use of the word as well as the various derivatives. Once the probability is determined that the classification of the new word is as close as statistically possible, in an embodiment, the new word, or a marker referring to the word, is stored into a database or computer storage module with an accompanying marker for future analysis. In an embodiment, the inflection and derivation analysis parses the accumulated text, reveals the accumulated text's underlying syntax and grammatical intent, and tags the accumulated text (504) according to predefined rules. In an embodiment, parsing rules allow for specific parsing of relevant and predefined data topics to focus specifically on the particular category being searched. For example, parsing can be geared toward virtually any criteria, such as Supreme Court nominee names, education, previous appointments, political positions, family, etc. In addition, predefined ancillary categories may also be used to assist parsing as well.

In an embodiment, the resultant web text is tagged (504) and classified into information sets (506). These information sets are stored (508). Returning to the above example again, an information set would not include both the Supreme Court nominee's political affiliation and law school, because they were obtained from different web pages. Rather, two separate sets would be created for each. However, embodiments of the present invention are not limited to any particular number of sets. Also, embodiments are not limited to any particular type of information. For example, age may be a set.

In an embodiment, ambiguous and slang words are also analyzed. Words that lexical analysis module 202 does not understand may be sent to a specialized computer, dictionary, or library structure with custom rules for slang, new, unknown, or ambiguous words. Such resources include, for example, slang, dialect, and various other dictionaries.

Figure 6:
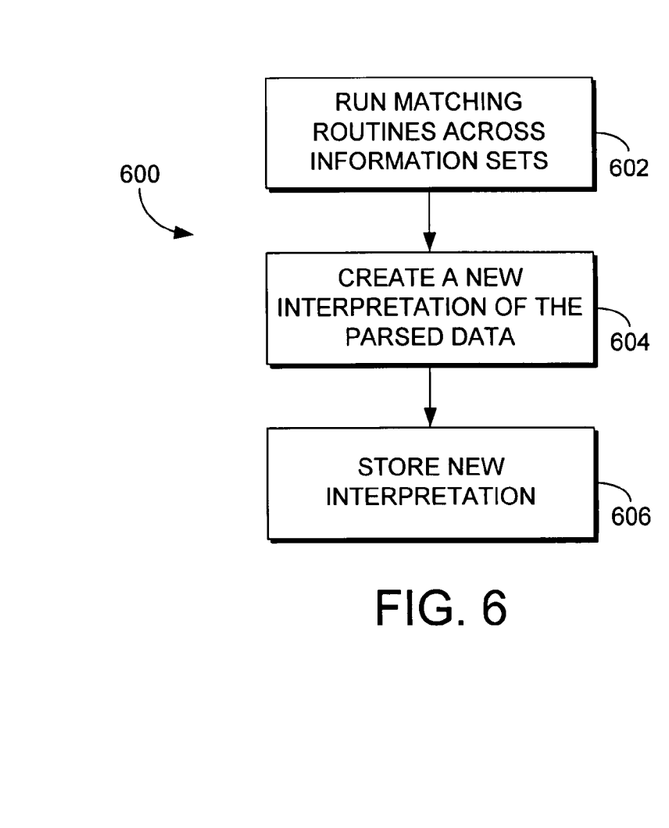
FIG. 6 is a flowchart illustrating a process that aggregates and summarizes web textual structures, according to embodiments of the present invention.

FIG. 6 is a flowchart illustrating a process that aggregates and summarizes web textual structures, according to embodiments of the present invention. In method 600, matching routines are run across all of the stored information sets (602). These routines compare the underlying syntactical structure and definition of each textual structure in an information set with the underlying syntactical structures and definitions of each textual structure in all other information sets. The matching routines keep track of the number of times similar textual structures are stored across all information sets. In addition, for each textual structure, in an embodiment, the matching routines count the number of times a subtending word, lexicon, or other closely related word is used in each information set. For example, if one information set stores that "John X is old," and another set stores that "John X is elderly," the matching routines will associate the two phrases because the words "old" and "elderly" are possible synonyms. However, embodiments are not limited to any specific example. From the matching routines, a new interpretation of all the information sets is formed (604). The new interpretation is then stored (606).

Figure 7:
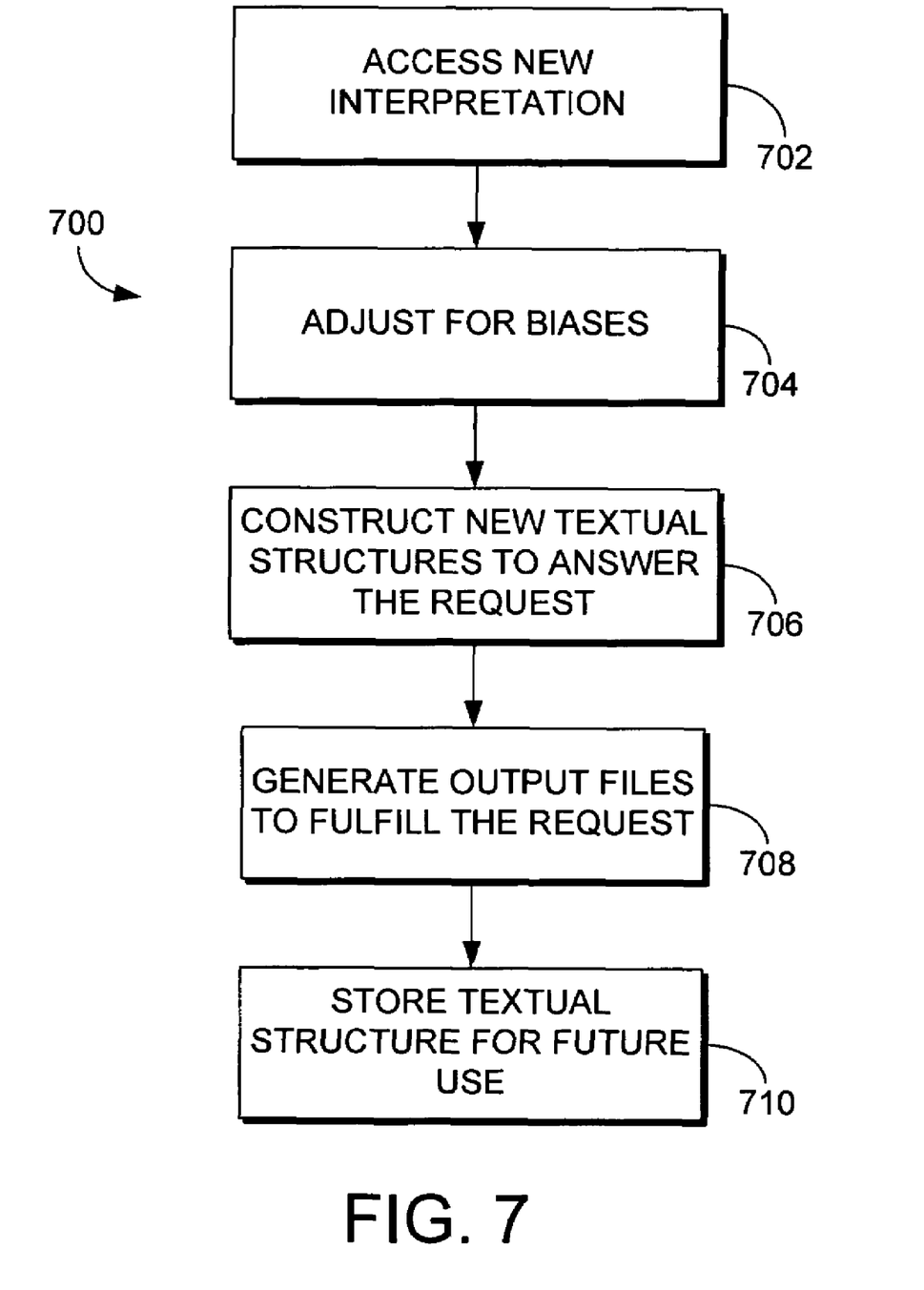
FIG. 7 is a flowchart illustrating a process that adjusts aggregated web information according to web source bias and generates new textual structures that detail the aggregated web information, according to embodiments of the present invention.

FIG. 7 is a flowchart illustrating a process that adjusts aggregated web information according to web source bias and generates new textual structures that detail the aggregated web information, according to embodiments of the present invention. In method 700, the newly created interpretation is accessed (702) and adjusted to account for source bias (704). In another embodiment, predefined grammatical templates are applied to alleviate bias. In an embodiment, these templates add language to the structure interpretation or remove language from the structure interpretation to eliminate bias. In another embodiment, bias eliminating templates are used. However, embodiments of the present invention are not limited to any specific means for eliminating bias.

After the information sets have been modified to account for bias, a new textual structure is constructed to fulfill the request (706), and an output file comprising the new textual structure is generated (708). In an embodiment, the new textual structure is a grammatically correct sentence or plurality of sentences. In another embodiment, an audio or video output file is constructed to fulfill the request. Predefined rules of grammar and syntax, Bayes Classifiers, regression analysis and multi-variable regression analysis techniques, correlation analysis, or multinomial modeling techniques can be used to construct a new textual structure. Regression analysis and multi-variable regression analysis techniques can establish the general statistical methods to define the probability of the correct usage or context of words within a sentence. For example, if the word "dog" is used multiple times in the various documents as a noun, in the context of an animal, then there is a higher probability that the next use of the word "dog" will also be used again in the same context. Regression analysis and multi-variable regression analysis techniques can be implemented in software, for example, by using infinite or finite state machines. However, embodiments are not limited to any type of software implementation, as other well known software techniques may also be used. In an embodiment, the results of specific analyses are stored in a database or other computer-readable media and later referenced for further analysis and sentence regeneration. With respect to sentence regeneration, templates can be used in conjunction with regression analysis methods to generate new textual structures. In an embodiment, basic and complex sentence structures are constructed based on the frequency use of words and classifiers. In another embodiment, a template-based approach is employed. Under this approach, generated nouns, verbs, and adjectives are inserted into template sentence structures. In still another embodiment, template sentence structures are defined in a number of ways, including asking generic questions or defining lists of general definitions. In an embodiment, the newly generated textual structure is stored for future use (710).

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media and flash memory devices.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system including a microprocessor for generating and presenting textual structures that summarize web content relevant to a topic, wherein the web content is posted on multiple web pages, comprising:

A plurality of computing units comprising the modules:
an ontology module to parse and classify text retrieved from at least one web page into at least one information set, wherein the at least one information set is stored;
a summation module to aggregate the at least one information set and create at least one structure interpretation using the at least one information set; and
a language generation module to create at least one new textual structure describing the web content relevant to the topic by incorporating the at least one structure interpretation into one or more grammatical templates that include basic grammar confines; and
a language bias module including language bias rules that formats the at least one new textual structure to account for at least one of a user bias preference or a system bias preference, wherein the language bias rules module assigns values to a web page corresponding to it relative bias.

2. The system of claim 1, wherein the language bias module reformats the at least one new textual structure according to biases of information sources that are determined using predefined parameters.

3. The system of claim 1, further comprising:
a database to store commonly used ontology information.

4. The system of claim 1, further comprising:
an archive database to store the at least one new textual structure for a period of time determined by a parameter.

5. The system of claim 1, wherein the ontology module, the summation module, and the generation module share a common storage module.

6. The system of claim 1, further comprising:
a personal profile manager to allow continual parsing of web text and creation of a new textual structure according to user-specific parameters.

7. The system of claim 1, further comprising:
a storage module to store the at least one information set.

8. The system of claim 1, further comprising:
a storage module to store the at least one structure interpretation.

9. The system of claim 1, further comprising:
a storage module to store the at least one new textual structure.

10. A computerized method for generating and presenting one or more textual structures that summarize web content relevant to a topic, comprising:
receiving a request for summarized web information from a user;
accumulating text from a plurality of web pages.

11. The method of claim 10, further comprising:
referencing an archived database to determine whether the archived database contains a generated textual structure that satisfies the user's request.

12. The method of claim 10, wherein the one or more textual structures includes at least one grammatically correct sentence.

13. A module being executed on a computer to construct at least one grammatically correct language structure from at least one structure interpretation of parsed web text,
wherein the at least one structure interpretation comprises a summation of parsed web textual structures based, in part, on underlying grammatical components and definitions of the parsed web text, and
wherein the at least one grammatically correct language structure is created by incorporating the at least one structure interpretation into one or more grammatical templates that include basic grammar confines.

14. The module of claim 13, wherein the module uses predefined textual structures to construct the at least one grammatically correct language structure.

15. The module of claim 13, wherein the module uses a statistical analysis methodology to construct the at least one grammatically correct language structure.

* * * * *